(12) United States Patent
Chandrika

(10) Patent No.: US 8,726,007 B2
(45) Date of Patent: May 13, 2014

(54) TECHNIQUES FOR PACKET PROCESSING WITH REMOVAL OF IP LAYER ROUTING DEPENDENCIES

(75) Inventor: K Sarath Chandrika, Dilsukhnagar (IN)

(73) Assignee: Novell, Inc., Provo, UT (US)

( * ) Notice: Subject to any disclaimer, the term of this patent is extended or adjusted under 35 U.S.C. 154(b) by 429 days.

(21) Appl. No.: 12/414,915

(22) Filed: Mar. 31, 2009

(65) Prior Publication Data

US 2010/0250920 A1 Sep. 30, 2010

(51) Int. Cl.
*H04L 29/06* (2006.01)

(52) U.S. Cl.
USPC ............ 713/152; 370/469; 370/389; 370/392

(58) Field of Classification Search
USPC .............. 713/152; 370/351, 389, 392, 395.31
See application file for complete search history.

(56) References Cited

U.S. PATENT DOCUMENTS

| | | | |
|---|---|---|---|
| 4,866,772 A * | 9/1989 | Schroter ........................ 713/151 |
| 6,119,170 A * | 9/2000 | Schoffelman et al. ........ 709/244 |
| 6,195,355 B1 * | 2/2001 | Demizu ......................... 370/397 |
| 6,425,013 B1 | 7/2002 | Schmidt et al. |
| 7,007,103 B2 | 2/2006 | Pinkerton et al. |
| 7,254,637 B2 | 8/2007 | Pinkerton et al. |
| 7,441,112 B2 | 10/2008 | Zimmer et al. |
| 2003/0081607 A1 * | 5/2003 | Kavanagh ...................... 370/392 |
| 2003/0088697 A1 * | 5/2003 | Matsuhira ...................... 709/238 |
| 2005/0021949 A1 * | 1/2005 | Izawa et al. ................... 713/165 |
| 2005/0100051 A1 * | 5/2005 | Kim et al. ...................... 370/477 |
| 2006/0075130 A1 | 4/2006 | Craft et al. |
| 2007/0025380 A1 * | 2/2007 | Amagai et al. ................ 370/428 |
| 2007/0180436 A1 * | 8/2007 | Travostino et al. ........... 717/138 |
| 2007/0297400 A1 | 12/2007 | Cameron et al. |
| 2008/0069116 A1 | 3/2008 | Pong |
| 2009/0245174 A1 * | 10/2009 | Chen ............................. 370/328 |
| 2011/0013641 A1 * | 1/2011 | Kolhi et al. .................... 370/401 |

* cited by examiner

*Primary Examiner* — Jung Kim
*Assistant Examiner* — Tri Tran
(74) *Attorney, Agent, or Firm* — Schwegman, Lundberg & Woessner, P.A.

(57) ABSTRACT

Techniques for packet processing with removal of Internet Protocol (IP) layer routing dependencies are presented. Encrypted packets associated with network communications occurring via a VPN and IP tunnel are grabbed off the network stack before being processed by an IP layer of the network stack. Next, an IP header is generated for the encrypted packets and the encrypted packets are sent to a socket application. The socket application provides the encrypted packets back to the network stack at the data link layer for delivery to the VPN over the IP tunnel.

23 Claims, 3 Drawing Sheets

TECHNIQUES FOR PACKET PROCESSING WITH REMOVAL OF IP LAYER ROUTING DEPENDENCIES

BACKGROUND

In the current implementation of secure Internet Protocol (IP) tunnel, tunnel communication (e.g. liveliness check) packets traverse all the layers of TCP/IP stack en route to a destination server. In such a case, the routing table entries at the IP layer partially control the communication channel. That is, any inappropriate route entry in the routing table is sufficient enough to change the packet path. Sometimes this might lead to the packet cycling within the host machine, session time outs, etc.

In a scenario where the routing table contains an entry for a Virtual Private Network (VPN) server that is destined to another network entity, the secure IP tunnel packet that is destined to that sever would never reach the VPN server due to the route entry. In a worse case scenario, where the routing table includes a route for the VPN server network routed to the virtual network interface (e.g. Network Tap (TAP interface)), the tunnel packet generated by the tunnel application is directed to a virtual interface, which in turn gives the packet back to the tunnel application residing in the host itself. So, the packet goes circling the path in the same host.

Secondly, all the packets that are processed and encrypted by a secure IP tunnel client are routed using the routing table entries, which are not needed. This includes application data (HTTP, FTP, Telnet, etc.) generated by the client.

A VPN client is said to be connected to the server when a secure IP tunnel connection gets established between the client and the server, and the client host machine is updated with the network routes based on the user access control policies. Every packet destined to the network in the user access control policies is routed to a virtual interface (e.g. Tap and/or Network TUNnel (TUN) interface) by the IP layer. All the packets coming from TAP/TUN interface are picked up by Secure IP tunnel client for policy validation and encryption. The destination IP address for the encrypted packet will be the VPN server's IP address. Once policy validation and encryption are performed, the packet is sent to TCP stack again and routed through the physical network. In this process, packets are obviously checked against the routing table entries for routing. Apart from the application data packets, all the tunnel communication packets also get encrypted and traverse all the layers of TCP/IP network stack.

With a faulty traffic policy that allows/denies a particular application data to public network destination that includes the VPN server network, the Open VPN (OpenVPN) tunnel communication fails. The user session gets terminated after a limited number of attempts. This is because the tunnel communication (e.g. liveliness check, tunnel negotiation) packets are routed to the TAP/TUN interface due to a subnet route entry. The packet is then routed to the OpenVPN application for policy validation and encryption. Here, since there may be no policy to allow traffic destined to VPN server's IP address: port combination, the packet is dropped. After a limited number of attempts for such a communication, the session is terminated. Other user access control policies fail due to the communication failure as well. An application data packet, which reaches OpenVPN application from TAP/TUN interface, gets encrypted. The destination IP address of every encrypted packet is the server's IP address. Now, the packet is handed to the TCP/IP stack. At the IP layer, since the routing table contains the destination network routed to TAP/TUN interface address, the packet is directed to TAP interface and is again forwarded to tunnel client application. This continues until tunnel termination occurs and thus the client connection aborts after few retries.

Thus, what are needed are improved techniques for packet processing that removes IP layer routing dependencies.

SUMMARY

In various embodiments, techniques for packet processing with removal of Internet Protocol (IP) layer routing dependencies are presented. More specifically, and in an embodiment, a method is provided for processing packets by removing IP layer routing dependencies. An encrypted packet is intercepted before the encrypted packet is processed by an IP layer of a network communication stack. The encrypted packet was being directed through the network communication stack to a Virtual Private Network (VPN) that is using an IP tunnel at the data link layer of the network communication stack. Next, an IP header is generated for the encrypted packet outside the IP layer of the network communication stack. Finally, the encrypted packet with the generated IP header is sent to a socket application for direct delivery to the data link layer of the network communication stack and for injection into the VPN via the IP tunnel.

DETAILED DESCRIPTION

As used herein a "resource" is an addressable and uniquely distinguishable entity, which is represented within a network, such as but not limited to, a user, a service, a group, a printer, a server, a website, a file, a directory, a domain, a device, custom-defined objects, etc.

Various aspects of this invention discuss usage of "IP tunnel." "IP tunneling" is a technique for connecting two disjoint IP networks that do not have a native path to each other over the Internet. The connection is achieved via a communications channel (IP tunnel) that uses encapsulation technologies across an intermediate network. IP tunnels are often used to create a VPN between two private networks over an insecure public network, such as the Internet. Every IP packet has address information for its source and destination networks, which is encapsulated or encrypted within another packet that is native to the transit network (IP tunnel).

A "TAP interface" simulates an Ethernet device and therefore operates on layer 2 (data link layer) packets, such as Ethernet frames. A "TUN interface" simulates a network layer device and it operates on layer 3 (Internet) packets, such as IP packets.

Layer 4 (transport) of the network stack includes Transmission Control Protocol (TCP) and layer 3 includes IP. The IP (layer 3) handles lower level transmissions from computer-to-computer or device-to-device, as a packet makes it way across the Internet. TCP operates at a higher level (layer 4) and is concerned with connecting two endpoints, such as a web browser to a web server. TCP provides a reliable mechanism for delivering packets from one program on one computer to another program on another computer.

A "socket" is a logical endpoint in a bidirectional communication flow. It is part of an Application Programming Interface (API) of the Operating System (OS) of a computer or processor-enabled device. It facilitates inter-process communication as a mechanism for delivering incoming data packets to a process or thread on a local IP or remote IP address. A socket is addressed via an IP address and port address combination, the port address defining the process on the device, which is addressed via the IP address.

According to an embodiment, the techniques presented herein are implemented in OS's. In an embodiment, the OS is Linux®, such as Suse® Linux®, distributed by Novell®, Inc. of Provo, Utah.

Of course, the embodiments of the invention can be implemented in a variety of architectural platforms and products. Any particular architectural layout, product, or implementation presented herein is provided for purposes of illustration and comprehension only and is not intended to limit various aspects of the invention.

It is within this initial context, that various embodiments of the invention are now presented with reference to the FIGS. 1-4.

Figure 1:
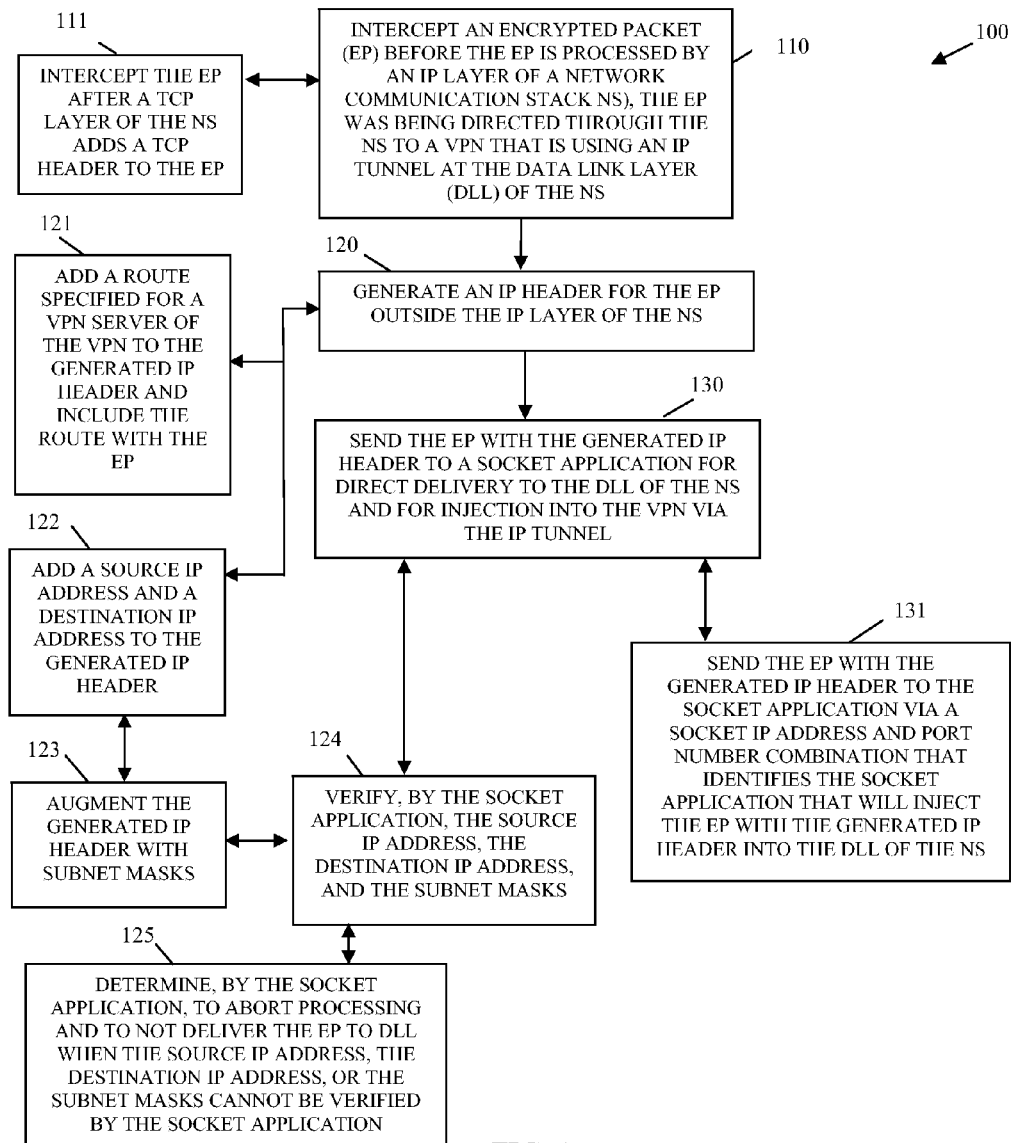
FIG. 1 is a diagram of a method that is provided for processing packets with the removal of IP layer routing dependencies, according to an example embodiment.

FIG. 1 is a diagram of a method 100 that is provided for processing packets with the removal of IP layer routing dependencies, according to an example embodiment. The method 100 (hereinafter "packet processing service") is implemented as instructions in a machine-accessible and computer-readable storage medium. The instructions when executed by one or more network-based machines (processing devices, processors, computers, etc.) perform the processing depicted in FIG. 1. The packet processing service is also operational over and processes within a network. The network may be wired, wireless, or a combination of wired and wireless.

Each of the processing steps presented herein with reference to the FIG. 1 and the packet processing service are executed on a processor specifically configured to execute the packet processing service. The packet processing service is implemented such that it has access to the layers of the network communication stack and can therefore, in some instances, operate at the kernel level of an OS.

In summary, the packet processing service is a technique where secure IP tunnel communication bypasses the IP layer routing decisions (layer 3). Every packet received by the network stack from a secure IP tunnel application is handled by the packet processing service, which uses a raw socket implementation to generate an IP header for the packet and then hands the modified packet off directly to the Datalink/Ethernet layer. That is, after the encrypted packet is formed by the secure IP tunnel client application and sent to the TCP/IP stack, the TCP header for the packet is formed by the TCP layer. After which, the packet processing service induced into the kernel of the OS and takes over the packet processing, generates the IP header for the packet (bypassing IP layer), and hands the packet to the physical layer through raw sockets. This process also includes information of the default route or a route specified for the VPN server's network. This helps when the client host is behind a Network Address Translation (NAT) device. So, before handing the packet to the physical layer, the source and destination network/masks are verified and an appropriate decision is made to send the packet out.

The packet processing service also takes care of the application data packets which undergo the one time policy validation and return to the stack. Once the encrypted packet is sent to the stack by the secure IP tunnel application, the TCP layer does its job and the innovation takes up the packet, proceeds with IP header, and routes the packet through physical layer.

It is also noted that this raw socket implementation takes care of redundant packet processing, removes IP layer routing dependencies, and fixes session failure problems that can occur with the client and which was discussed above.

With this context, the details of the packet processing service are now discussed with reference to the FIG. 1.

At 110, the packet processing service intercepts an encrypted packet before the encrypted packet is processed by an IP layer of a network communication stack. The encrypted packet is associated with VPN communications between two or more resources (users or automated applications). So, the encrypted packet is traversing or being routed through the network communication stack beginning at the application layer and traversing the Transmission Control Protocol (TCP) layer; however, before the encrypted packet is sent to the IP layer, the packet processing service intercepts the packet and removes the conventional processing that would normally occur from the IP layer of the network communication stack. The encrypted packet is en route through the network stack to a data link layer for injection into an IP tunnel representing the VPN.

The processor that executes the packet processing service resides on a sending machine (computer or processor-enabled device) and the packet processing service operates at a kernel level of the OS of that machine so as to permit the packet processing service to intercept and alter processing associated with routing packets through the network communication stack.

According to an embodiment, at 111, the packet processing service intercepts the encrypted packet immediate after or as soon as the TCP layer finishes its processing on the encrypted packet and just before the TCP layer was about to hand off the encrypted packet to the IP layer of the network communication stack. The TCP layer adds a TCP header to the encrypted packet.

At 120, the packet processing service generates an IP header for the encrypted packet and this generation of the IP header occurs outside the IP layer of the network communication stack. So, it is noted again that the IP layer does not receive and process the encrypted packet in any manner. This eliminates the problems that can occur on the encrypted packet at the IP layer, as was presented and discussed above. Essentially, all IP layer dependencies have been avoided by taking control away from the IP layer. The packet processing service generates the IP header for the encrypted packet and the packet processing service is not part of the network communication stack.

According to an embodiment, at 121, the packet processing service adds a route that is specified for a VPN server of the VPN. The route is included with the generated IP header that the packet processing service generated.

In another case, at 122, the packet processing service adds a source IP address and a destination IP address to the generated IP header. The source IP address is the sending resource and the destination IP address is the resource that is to receive the encrypted packet.

Continuing with the embodiment of 122 and at 123, the packet processing service augments or adds to the generated IP header so as to include subnet masks that may be used to properly route the encrypted packet once it reaches its destination IP address.

Still continuing with the embodiment of 123 and at 124, the socket application (discussed below at 130) verifies the source IP address, the destination IP address, and the subnet masks.

So, continuing with the embodiment of 124 and at 125, the socket application determines whether to abort processing and to not deliver the encrypted packet to the data link layer of the network communication stack when the source IP address, the destination IP address, or subnet masks cannot be verified by the socket application.

At 130, the packet processing service sends the encrypted packet with the generated IP header to the socket application for the socket application to directly deliver the encrypted packet and its IP header to the data link layer of the network communication stack. Once at the data link layer the encrypted packet is injected into the VPN via the IP tunnel for delivery to the destination IP address.

In an embodiment, at 131, the packet processing service sends the encrypted packet with the generated IP header to the socket application via a socket IP address and port number/address combination that specifically identifies and invokes the socket application. Again, the socket application injects the encrypted packet with the generated IP header into the data link layer of the network communication stack for routing through the IP tunnel.

One now fully appreciates how secure VPN communications that utilize IP tunnels can have their communication packets manipulated and routed in manners that both include some portions of the conventional network communication stack and that exclude other portions of the conventional network communication stack. Specifically, the IP layer is bypassed and IP layer dependencies and problems that can occur are avoided.

Figure 2:
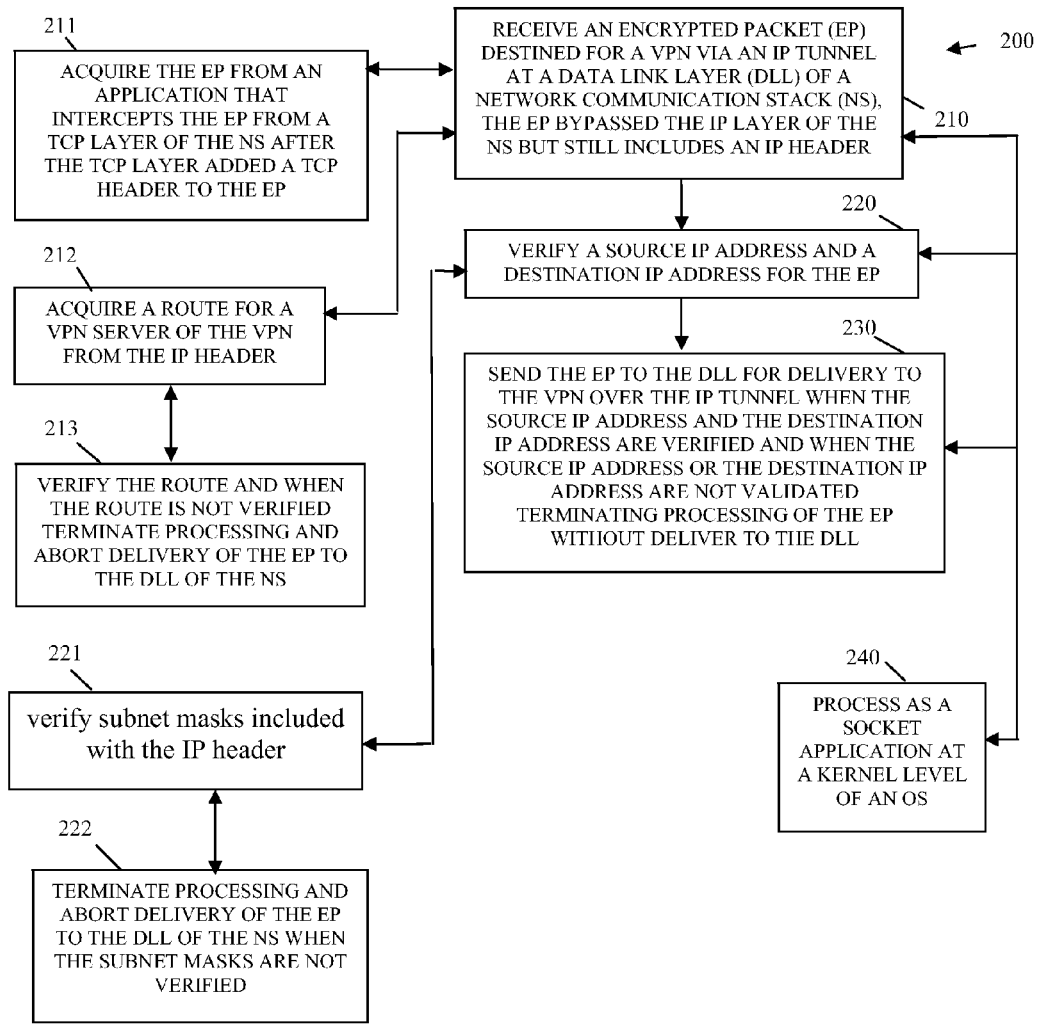
FIG. 2 is a diagram of another method for processing packets with the removal of IP layer routing dependencies, according to an example embodiment.

FIG. 2 is a diagram of another method 200 for processing packets with the removal of IP layer routing dependencies, according to an example embodiment. The method 200 (herein after referred to as "router modification service") is implemented in a machine-accessible and computer-readable storage medium as instructions, which when accessed by one or more machines (processors, etc.) perform the processing depicted in the FIG. 2; the router modification service is also operational over a network; and the network may be wired, wireless, or a combination of wired and wireless.

Again, it is noted that each of the processing steps presented herein and below with respect to the FIG. 2 and the router modification service are executed on a processor, and the processor is specifically configured to execute the router modification service.

The router modification service presents another and in some ways enhanced perspective from that which was discussed with the packet processing service represented by the method 100 of the FIG. 1 and discussed above.

Specifically, the router modification service represents processing associated with the socket application discussed in detail above with reference to the method 100 of the FIG. 1.

At 210, the router modification service receives an encrypted packet. The encrypted packet can be received from the packet processing service represented by the method 100 and discussed in detail above with reference to the FIG. 1.

The encrypted packet was traversing through a network stack as a packet of data associated with communication between a source IP address (sender) and a destination IP address (receiver). The encrypted packet was attempting to work its way through the network communication stack to get to a VPN that is using an IP tunnel located at the data link layer of the network communication stack. Conventionally, this would have entailed that the encrypted packet pass through the IP layer of the network communication. However, the encrypted packet is grabbed off the network communication stack before it can pass through the IP layer and it is sent to or received by the router modification service.

It is noted that although the encrypted packet is not processed by the IP layer of the network communication stack, the encrypted packet still has an IP header. How this is done was discussed in detail above with reference to the method 100 of the FIG. 1.

So, in an embodiment, at 211, the router modification service acquires the encrypted packet from an application (such as the packet processing service discussed above with reference to the method 100 and the FIG. 1). The application intercepts the encrypted packet from a TCP layer of the network communication stack after that TCP layer does its processing and includes a TCP header for the encrypted packet. This application also generates and adds the IP layer to the encrypted packet since the encrypted packet is entirely bypassing the IP layer of the network communication stack.

In another case, at 212, the router modification service acquires a route for a VPN server of the VPN from the IP header associated with the encrypted packet.

Continuing with the embodiment of 212 and at 213, the router modification service verifies the route and when that route is not verified the router modification service terminates processing and aborts delivery of the encrypted packet to the data link layer of the network stack.

At 220, the router modification service verifies a source IP address and a destination IP address for the encrypted packet. The source and destination IP addresses were acquired from the IP header of the encrypted packet.

According to an embodiment, at 221, the router modification service also verifies subnet masks included in the IP header. Accordingly, at 222, the router modification service can terminate processing and abort delivery of the encrypted packet to the data link layer of the network communication stack when the subnet masks are not verified by the router modification service.

At 230, the router modification service sends the encrypted packet to the data link layer for delivery to the VPN over the IP tunnel when the source IP address and the destination IP address are verified. When the source IP address and the destination IP address are not verified the router modification service terminates processing of the encrypted packet without delivering the encrypted packet to the data link layer of the network communication stack.

In an embodiment and as was mentioned above, the router modification service is processed as a socket application that operates at a kernel level within an OS of the processor, which is executing the processing steps of the router modification service. Again, the interaction between the packet processing service of the method 100 and the socket application were described above with reference to the FIG. 1. FIG. 2 shows the processing aspects of that socket application, which is the router modification service.

Figure 3:
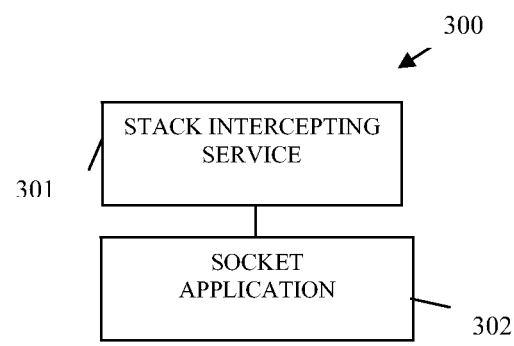
FIG. 3 is a diagram of a packet processing system, according to an example embodiment.

FIG. 3 is a diagram of a packet processing system 300, according to an example embodiment. The packet processing system 300 is implemented in a machine-accessible and computer-readable storage medium as instructions, which when executed by one or more machines (computers, processors, or processor-enabled devices) perform, among other things, the processing depicted in the method 100 of the FIG. 1 and depicted in the method 200 of the FIG. 2. The packet processing system 300 is also operational over a network; the network may be wired, wireless, or a combination of wired and wireless.

The packet processing system 300 includes a stack intercepting service 301 and a socket application 302. Each of these components and their interactions with one another will now be discussed in turn.

The stack intercepting service 301 resides in a computer-readable storage medium and is executed by the processor. Processing details associated stack intercepting service 301 were described in detail above with the packet processing service represented by the method 100 and depicted in detail within the FIG. 1.

The stack intercepting service 301 intercepts a packet being sent through a network stack after that packet exits a TCP layer of the network stack and before the packet is processed by an IP layer of the network stack. Also, the stack intercepting service 301 is to add an IP header to the packet and provide the packet with the IP header to the socket application 302.

According to an embodiment, the stack intercepting service 301 receives the packet with a TCP header that was added at the TCP layer of the network stack.

Continuing with the previous embodiment, the stack intercepting service 301 generates the IP header and includes within the IP header a source IP address and a destination IP address for the packet.

Still continuing with the previous embodiment, the stack intercepting service 301 also adds a route to a VPN server associated with the VPN to the packet.

In a particular case, the stack intercepting service 301 identifies the socket application 302 for delivering the packet via a socket IP address and port address combination.

The socket application 302 resides in a computer-readable storage medium and is executed by the processor. Processing details associated with the socket application 302 were described in detail above with the router modification service represented by the method 200 and depicted in detail within the FIG. 2.

The socket application 302 delivers the packet (once received from the stack intercepting service 301) with the IP header directly back to the network stack at the data link layer where the packet is injected into an IP tunnel for delivery over a VPN.

In an embodiment, the socket application 302 also verifies the source IP address, the destination IP address, and the route when the socket application 302 receives the packet from the stack intercepting service 301. So, if something is amiss with the IP addresses of the route or even subnet masks, then the socket application 302 can abort processing and not send the packet to the data link layer for deliver to the VPN over the IP tunnel.

Figure 4:
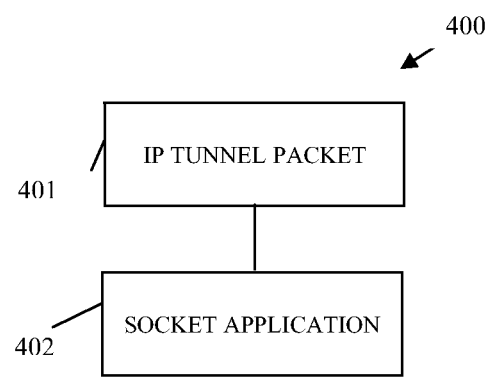
FIG. 4 is a diagram of another packet processing system, according to an example embodiment.

FIG. 4 is a diagram of another packet processing system 400, according to an example embodiment. The packet processing system 400 is implemented as instructions on or within a machine-accessible and computer-readable storage medium. The instructions when executed by one or more machines (processor-enabled devices, computers, and/or processors) perform, inter alia; the processing depicted with respect to the methods 100 and 200 of the FIGS. 1 and 2, respectively, and with respect to the system 300 of the FIG. 3. The packet processing system 400 is also operational over a network and the network may be wired, wireless, or a combination of wired and wireless.

The packet processing system 400 is another and in some cases enhanced perspective of the packet processing system 300 discussed above with reference to the FIG. 3.

The packet processing system 400 includes an IP tunnel packet 401 and a socket application 402. Each of these components and their interactions with one another will now be discussed in turn.

The IP tunnel packet 401 resides in a computer-readable storage medium and is processed by the processor as the IP tunnel packet 401 traverses a network stack for delivery to a VPN over an IP tunnel at a data link layer of the network stack. Example aspects of the IP tunnel packet 402 were presented in detail above with reference to the methods 100 and 200 of the FIGS. 1 and 2, respectively, and with respect to the system 300 of the FIG. 3.

The IP tunnel packet 401 bypasses an IP layer of the network stack as it is being processed through the network stack and is delivered to the socket application 402.

According to an embodiment, an application that is executed by the processor intercepts the IP tunnel Packet 401 after the IP tunnel packet exists a TCP layer of the network stack and before the IP tunnel packet 401 has an opportunity to progress to the IP layer of the network stack. The application adds an IP header to the IP tunnel packet and supplies the IP tunnel packet 401 with the IP header directly socket application 402.

The socket application 402 is implemented and resides in a computer-readable storage medium and is processed by the processor. Example features and processing details associated with the socket application 402 were presented above in detail with reference to the method 200 of the FIG. 2 and with respect to the system 300 of the FIG. 3.

The socket application 402 directly supplies the IP tunnel packet 401 to the data link layer for delivery to the VPN over the IP tunnel.

According to an embodiment, the socket application 402 verifies a source IP address, a destination IP address, and subnet masks included in the IP header and when verified sends the IP tunnel packet 401 to the data link layer and when not verified terminates processing of the IP tunnel packet and does not deliver the IP tunnel packet 401 to the data link layer.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing in a computer-readable storage medium to process on a processor that is configured to execute the method and the method, comprising:

intercepting, by the processor, an encrypted packet before the encrypted packet is processed by an Internet Protocol (IP) layer of a network communication stack, the IP layer is an IP routing layer of the network communication stack, the encrypted packet was being directed through the network communication stack to a Virtual Private Network (VPN) that is using an IP tunnel at a data link layer of the network communication stack, wherein each additional encrypted packet received by the network communication stack is also intercepted and processed by the method;

generating, by the processor, an IP header for the encrypted packet outside the IP layer of the network communication stack; and sending, by the processor, the encrypted packet with the generated IP header to a socket application for direct delivery to the data link layer of the network communication stack and for injection into the VPN via the IP tunnel and bypassing the IP routing layer of the network communication stack, the socket application processes to also handle redundant packet processing, removal of all IP layer routing dependencies and control taking away from the IP layer, and fix session failure problems that occur with a client involved in sending the encrypted packet, the IP layer does not receive and process the encrypted packet in any manner, and wherein all secure IP tunnel communication bypasses routing decisions of the IP routing layer on the processor, and wherein a source mask and a destination mask for the encrypted packet are verified before the encrypted packet is delivered to the data link layer.

2. The method of claim 1, wherein intercepting further includes, intercepting the encrypted packet after a Transmission Control Protocol (TCP) layer of the network communication stack adds a TCP header to the encrypted packet.

3. The method of claim 1, wherein generating further includes adding a route specified for a VPN server of the VPN to the generated IP header and including the route with the encrypted packet.

4. The method of claim 1, wherein generating further includes adding a source IP address and a destination IP address to the generated IP header.

5. The method of claim 4, wherein adding further includes, augmenting the generated IP header with subnet masks.

6. The method of claim 5, wherein sending further includes verifying, by the socket application, the source IP address, the destination IP address, and the subnet masks.

7. The method of claim 6, wherein verifying further includes determining, by the socket application, to abort processing and to not deliver the encrypted packet to the data link layer and IP tunnel when the source IP address, the destination IP address, or the subnet masks cannot be verified by the socket application.

8. The method of claim 1, wherein sending further includes sending the encrypted packet with the generated IP header to the socket application via a socket IP address and port number combination that identifies the socket application that will inject the encrypted packet with the generated IP header into the data link layer of the network communication stack.

9. A method implemented and residing in a computer-readable storage medium to process on a processor that is configured to execute the method and the method, comprising:

receiving, by the processor, an encrypted packet destined for a Virtual Private Network (VPN) via an Internet Protocol (IP) tunnel at a data link layer of a network communication stack, the encrypted packet bypassed the IP layer of the network communication stack but still includes an IP header, the IP layer is an IP routing layer of the network communication stack and that layer was bypassed during packet processing, and wherein each additional encrypted packet received by the network communication stack is also received and processed by the method;

verifying, by the processor, a source IP address and a destination IP address for the encrypted packet;

sending, by the processor, the encrypted packet to the data link layer for delivery to the VPN over the IP tunnel when the source IP address and the destination IP address are verified and when the source IP address or the destination IP address are not validated terminating processing of the encrypted packet without deliver to the data link layer, and wherein a source mask and a destination mask for the encrypted packet are verified before the encrypted packet is delivered to the data link layer; and processing, by the processor the method as a socket application at a Kernel layer of an Operating System, the socket application processes to also handle redundant packet processing, removal of all IP layer routing dependencies and taking control away from the IP layer, and fix session failure problems that occur with a client involved in sending the encrypted packet, and the IP layer does not receive and process the encrypted packet in any manner, and wherein all secure IP tunnel communication bypasses routing decisions of the IP routing layer on the processor.

10. The method of claim 9, wherein receiving further includes acquiring the encrypted packet from an application executing on the processor that intercepts the encrypted packet from a Transmission Control Protocol (TCP) layer of the network communication stack after the TCP layer added a TCP header to the encrypted packet.

11. The method of claim 9, wherein receiving further includes acquiring a route for a VPN server of the VPN from the IP header.

12. The method of claim 11, wherein acquiring further includes verifying the route and when the route is not verified terminate processing and abort delivery of the encrypted packet to the data link layer of the network communication stack.

13. The method of claim 9, wherein verifying further includes verifying subnet masks included with the IP header.

14. The method of claim 13, wherein sending further includes terminating processing and abort delivery of the encrypted packet to the data link layer of the network communication stack when the subnet masks are not verified.

15. A processor-implemented system residing in a computer-readable storage medium and adapted to be executed by a processor of a network, comprising:

a stack intercepting service residing in a computer-readable medium and executed by the processor; and a socket application residing in a computer-readable medium and executed by the processor;

wherein the stack intercepting service is to intercept every packet being sent through a network stack after the packet exits a Transmission Control Protocol (TCP) layer of the network stack and before the packet is processed by an Internet Protocol (IP) layer of the network stack, the IP layer is an IP routing layer of the network stack and is bypassed, and the stack intercepting service is to add an IP header to each packet and provide each packet with the IP header to the socket application, the socket application is to deliver each packet with the IP header directly back to the network stack at the data link layer where each packet is injected into an IP tunnel for delivery over a Virtual Private Network (VPN) bypassing the IP routing layer of the network stack, the socket application processes to also handle redundant packet processing, removal of all IP layer routing dependencies and taking control away from the IP layer, and fix session failure problems that occur with a client involved in sending each packet, and the IP layer does not receive and process any packet in any manner and wherein all secure IP tunnel communication bypasses routing decisions of the IP routing layer on the processor, and wherein a source mask and a destination mask for the packet are verified before the packet is delivered to the data link layer.

16. The system of claim 15, wherein the stack intercepting service receives each packet with a TCP header that was added at the TCP layer of the network stack.

17. The system of claim 16, wherein the stack intercepting service is to generate the IP header and includes within the IP header a source IP address and a destination IP address for each packet.

18. The system of claim 17, wherein the stack intercepting service is to also add a route to a VPN server associated with the VPN to each packet.

19. The system of claim 18, wherein the socket application is to verify the source IP address, the destination IP address, and the route when the socket application receives each packet from the stack intercepting service.

20. The system of claim 15, wherein the stack intercepting service identifies the socket application for delivering each packet via a socket IP address and port address combination.

21. A processor-implemented system residing in a computer-readable storage medium and adapted to be executed by a processor of a network, comprising:
   an Internet Protocol (IP) tunnel packet residing in a computer-readable storage medium and being processed by the processor as the IP tunnel packet traverses a network stack for delivery to a Virtual Private Network (VPN) over an IP tunnel at a data link layer of the network stack; and
   a socket application implemented and residing in a computer-readable storage medium and being processed by the processor;
   wherein the IP tunnel packet bypasses an IP layer of the network stack as it is being processed through the network stack and delivered to the socket application, the IP layer is an IP routing layer of the network stack, the socket application directly supplies the IP tunnel packet to the data link layer for delivery to the VPN over the IP tunnel bypassing the IP routing layer of the network stack, the socket application processes to also handle redundant packet processing, removal of all IP layer routing dependencies and taking control away from the IP layer, and fix session failure problems that occur with a client involved in sending the encrypted packet, and the IP layer does not receive and process the encrypted packet in any manner and wherein all secure IP tunnel communication bypasses routing decisions of the IP routing layer on the processor, and wherein a source mask and a destination mask for the IP tunnel packet are verified before the IP tunnel packet is delivered to the data link layer.

22. The system of claim 21, wherein an application that is executed by the processor intercepts the IP tunnel Packet after the IP tunnel packet exists a Transmission Control Protocol (TCP) layer of the network stack and before the IP tunnel packet as an opportunity to progress to the IP layer of the network stack, the application adds an IP header to the IP tunnel packet and supplies the IP tunnel packet to the socket application.

23. The system of claim 21, wherein the socket application verifies a source IP address, a destination IP address, and subnet masks included in the IP header and when verified sends the IP tunnel packet to the data link layer and when not verified terminating processing of the IP tunnel packet and not delivering the IP tunnel packet to the data link layer.

* * * * *